United States Patent
Joshita

[11] Patent Number: 5,971,094
[45] Date of Patent: Oct. 26, 1999

[54] ELECTRIC POWER STEERING DEVICE

[75] Inventor: Kaname Joshita, Osaka, Japan

[73] Assignee: Koyo Seiko Co., Ltd., Osaka, Japan

[21] Appl. No.: 08/871,844

[22] Filed: Jun. 9, 1997

[30] Foreign Application Priority Data

Jun. 19, 1996 [JP] Japan .................. 8-180018

[51] Int. Cl.⁶ .................................................. B62D 5/04
[52] U.S. Cl. ............................................................ 180/444
[58] Field of Search ......................... 180/443, 444, 180/446

[56] References Cited

U.S. PATENT DOCUMENTS

| | | | |
|---|---|---|---|
| 4,415,054 | 11/1983 | Drutchas | 180/444 |
| 4,577,715 | 3/1986 | Saito | 180/444 |
| 4,666,014 | 5/1987 | Carlson et al. | 180/444 |
| 4,773,497 | 9/1988 | Carlson et al. | 180/444 |
| 5,623,409 | 4/1997 | Miller | 180/443 |
| 5,685,390 | 11/1997 | Chikuma et al. | 180/444 |
| 5,836,419 | 11/1998 | Shimizu et al. | 180/443 |

FOREIGN PATENT DOCUMENTS

| | | |
|---|---|---|
| 0630800 | 12/1994 | European Pat. Off. . |
| 0673827 | 9/1995 | European Pat. Off. . |
| 0741067 | 11/1996 | European Pat. Off. . |
| 916370 | 8/1954 | Germany . |
| 2018367 | 7/1971 | Germany . |

*Primary Examiner*—Kevin Hurley
*Attorney, Agent, or Firm*—Thelen, Reid & Priest

[57] ABSTRACT

In an electric power steering device, a rotary element screwed on a rack engaged with a pinion, which is rotated by steering operation, is driven by a motor. A vehicle is steered by longitudinal shifting of the rack due to rotation of the pinion. By rotation of the rotary element, a steering assistance power along the longitudinal direction of the rack is generated. A torque limiter is provided between the rotary element and the output element of the motor.

7 Claims, 5 Drawing Sheets

ELECTRIC POWER STEERING DEVICE

FIELD OF THE INVENTION

The present invention relates to a rack pinion type electric power steering device wherein a steering assistance power is generated by driving a rotary element screwed on a rack by means of a motor.

DESCRIPTION OF RELATED ART

The electric power steering device of a vehicle disclosed in U.S. Pat. No. 4,415,054 comprises a pinion which rotates by steering operation, a rack engaged with the pinion, a rotary element screwed on the rack, and a motor which drives the rotary element. The vehicle is steered by the longitudinal shifting of the rack due to the rotation of the pinion. The steering assistance power is generated along the longitudinal direction of the rack by the rotation of the rotary element.

Traditionally, the rotation of the motor's output element is transmitted to the rotary element via a serration or a spline. Alternatively, an electromagnetic clutch is provided between the output element and the rotary element to allow the transmission of rotation when the motor is excited.

When the output element is joined to the rotary element via a serration or a spline, the joint is rattled. This causes noise to the driver and decreased durability.

When the electromagnetic clutch is provided between the output element and the rotary element, the structure is complicated and production cost is increased. Also, the electromagnetic clutch connects the output element with the rotary element when the motor is excited, therefore, the steering operation is impossible and any fail safe function can not by effected if the motor is locked in the exciting condition.

The object of the present invention is to provide an electric power steering device free from the above-described problems.

SUMMARY OF THE INVENTION

The electric power steering device of a vehicle of the present invention comprises a pinion which rotates by steering operation, a rack engaged with the pinion, a rotary element screwed on the rack, and a motor which drives the rotary element, wherein the vehicle is steered by the longitudinal shifting of the rack due to the rotation of the pinion, the steering assistance power is generated along the longitudinal direction of the rack by the rotation of the rotary element, and a torque limiter is provided between the rotary element and the output element of the motor.

According to this constitution, the rotation of the motor can be transmitted from the output element to the rotary element via the torque limiter, whereby rattling during the transmission of the rotation can be prevented. Also, when the motor is locked, the output element and the rotary element can be relatively rotated via the torque limiter.

Preferably, the torque limiter in the present invention has a torque setting element which is radially deformed by being sandwiched between the rotary element and the output element, wherein a radial force corresponding to the radial deformation of the torque setting element is exerted on the rotary element and the output element, and wherein limit torque of the torque limiter corresponds to the radial deformation of the torque setting element.

According to this constitution, by exerting a radial force corresponding to the radial deformation of the torque setting element on the output element and the rotary element, a frictional resistance between the torque setting element and the output element and also a frictional resistance between the torque setting element and the rotary element are generated. By these frictional resistances, a torque can be transmitted between the output element and the rotary element. Also, the limit torque depends on either of the frictional resistances. That is, relative slippage occurs either between the torque setting element and the output element or between the torque setting element and the rotary element, whichever offers the lower frictional resistance, when the transmission torque between the output element and the rotary element exceeds the limit torque. Because the output element and the rotary element are relatively rotated by the slippage, the torque limiter effectively functions. Because the torque limiter can be configured simply by adding a torque setting element, it is possible to simplify the structure, decrease the number of parts and machining processes, and reduce production cost.

Alternatively, it is preferable that the torque limiter in the present invention has a torque setting element which is radially deformed by being sandwiched between the rotary element and the output element, wherein a radial force corresponding to the radial deformation of the torque setting element is exerted on the rotary element and the output element, wherein the rotary element is forced into the output element, and wherein limit torque of the torque limiter corresponds to the total of a first frictional resistance, which corresponds to the radial deformation of the torque setting element, and a second frictional resistance, which corresponds to the press fit force with which the rotary element is forced into the output element.

According to this constitution, by exerting a radial force corresponding to the radial deformation of the torque setting element on the output element and the rotary element, a frictional resistance between the torque setting element and the output element and also a frictional resistance between the torque setting element and the rotary element are generated. The smaller one of the two frictional resistances is the first frictional resistances. Also, by forcing the rotary element into the output element, a second frictional resistance is generated between the output element and the rotary element. The first frictional resistance corresponds to the radial deformation of the torque setting element. The second frictional resistance corresponds to the press fit force with which the rotary element is forced into the output element. By the total of the first frictional resistance and the second frictional resistance, a torque can be transmitted between the output element and the rotary element. The limit torque depends on the total of the first frictional resistance and the second frictional resistance. That is, relative slippage occurs either between the torque setting element and the output element or between the torque setting element and the rotary element, whichever offers the lower frictional resistance, when the transmission torque between the output element and the rotary element exceeds the limit torque. At the same time, relative slippage occurs between the output element and the rotary element. Because the output element and the rotary element are relatively rotated by these slippage, the torque limiter effectively functions.

Because the torque limiter can be configured simply by adding a torque setting element, it is possible to simplify the structure, decrease the number of parts and machining processes, and reduce production cost. In this case, the torque setting element can be made more compact than in the case where the limit torque is set according to the first frictional resistance alone, so that the device can be made more compact in whole.

It is preferable that the first frictional resistance is greater than the second frictional resistance. By this constitution, the press fit force, with which the rotary element is forced into the output element, can be roughly set when the limit torque is set within a desired range. Thereby, the necessity of increasing the radial dimensional precision in the output element and rotary element is obviated.

The torque setting element has a characteristic, in that the radial force increases in proportion to the radial deformation when the radial deformation is less than a specific value, and the ratio of increase in the radial force to the radial deformation at the time when the radial deformation exceed the specific value is smaller than that at the time when the radial deformation is below the specific value, and the radial deformation of the torque setting element is set to a value in the range in which the radial deformation exceeds the specific value.

By this arrangement, the ratio of increase in the radial force to the radial deformation of the torque setting element is smaller than that at the time when the radial force increases in proportion to the radial deformation. Therefore, the variation in the radial force can be decreased, even if the radial deformation of the torque setting element is varied from a design value due to machining tolerance in the diametric dimensions of the output element and the rotary element. This makes it easy to set the limit torque, which depends on the radial force, within a desired setting range, whereby the necessity of a limit torque adjusting mechanism is obviated, limit torque adjusting labor is saved, and the structure is simplified by reducing the number of parts.

According to the electric power steering device of the present invention, it is possible to prevent the noise to the driver and the decrease in durability, to ensure fail safe function in cases where the motor is locked, to simplify the structure, and to reduce the production cost.

DETAILED DESCRIPTION OF PREFERRED EMBODIMENT

The first embodiment of the present invention is hereinafter described with reference to FIGS. 1 through 8.

Figure 1:
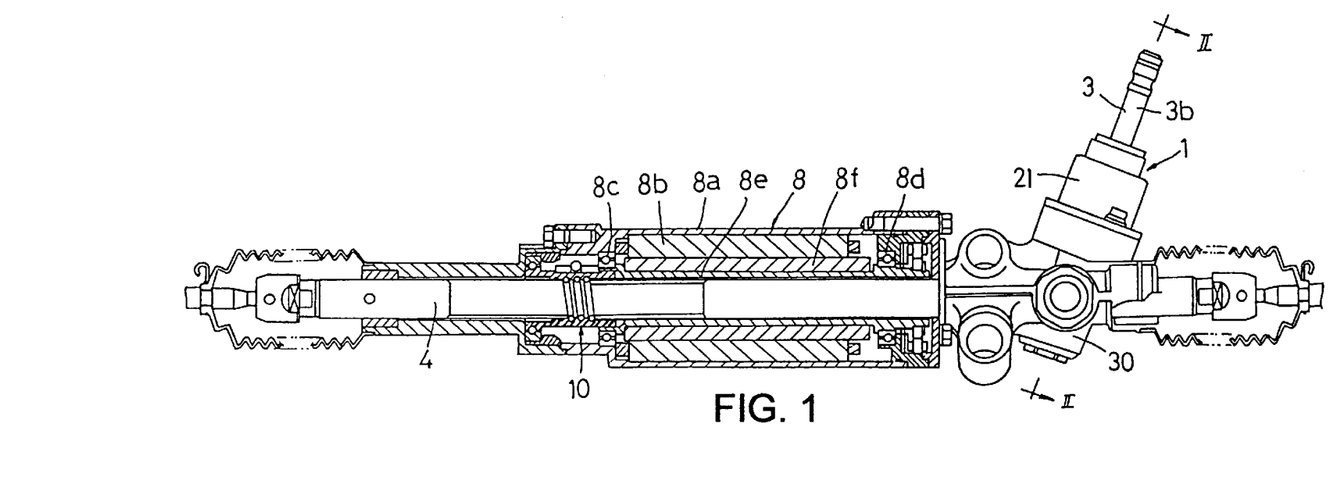
FIG. 1 is a cross-sectional view of the electric power steering device in the first embodiment of the present invention.
Figure 2:
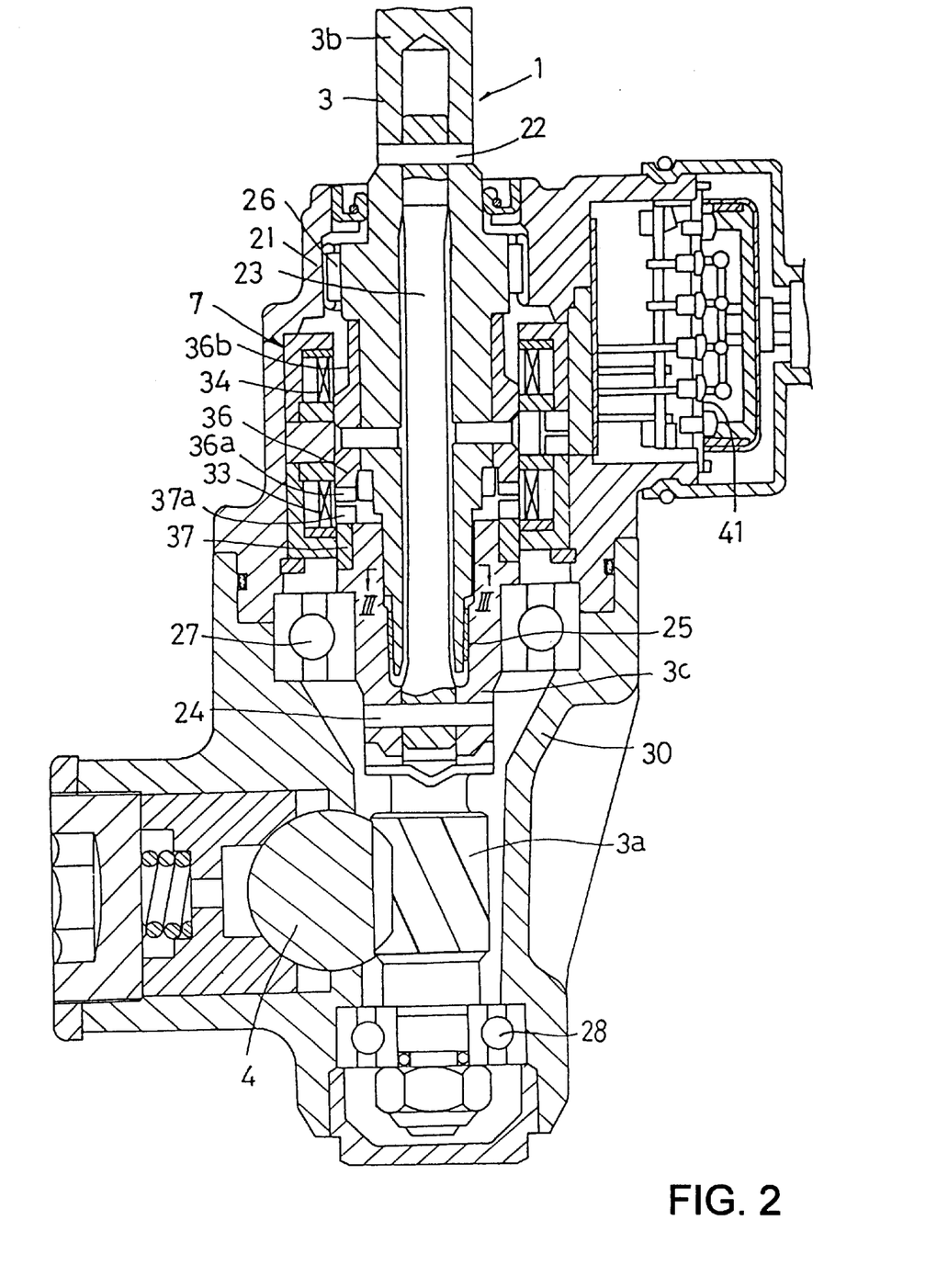
FIG. 2 is a cross-sectional view of FIG. 1 along the II—II line.

The rack pinion type electric power steering device 1 illustrated in FIGS. 1 and 2 comprises a steering torque transmission shaft 3 which rotates by operating a steering wheel (not illustrated), a pinion 3a formed at one end of the steering torque transmission shaft 3, and a rack 4 engaged with the pinion 3a. Each of the ends of the rack 4 is joined to a vehicle's wheel (not illustrated). By the rotation of the pinion 3a due to the steering operation, the rack 4 is longitudinally shifted along the vehicle's width direction. By this shifting of the rack 4, the vehicle is steered.

For providing a steering assistance power according to the steering torque transmitted by the steering torque transmission shaft 3, a torque sensor 7 for detecting the steering torque, a motor 8 driven according to the detected steering torque, and a screw mechanism 10 for transmitting the torque of the motor 8 to the rack 4 are provided.

The steering torque transmission shaft 3 is supported by a housing 21 of the torque sensor 7 and a pinion housing 30 covering the pinion 3a via bearings 26, 27 and 28. In the housings 21 and 30, the steering torque transmission shaft 3 is divided into a first shaft 3b, which is arranged adjacent to the steering wheel, and a second shaft 3c, which is fitted to the outer circumference of the first shaft 3b via a bush 25 so as to be rotatable relative to the first shaft 3b. The pinion 3a is formed around the second shaft 3c. A torsion bar 23 is inserted into the shafts 3b and 3c as an elastic element along the central axis of the shafts 3b and 3c. One end of the torsion bar 23 is joined to the first shaft 3b by a pin 22, and the other end is joined to the second shaft 3c by a pin 24. By this constitution, the first shaft 3b and the second shaft 3c are elastically rotatable relative to each other according to the steering torque.

Figure 3:
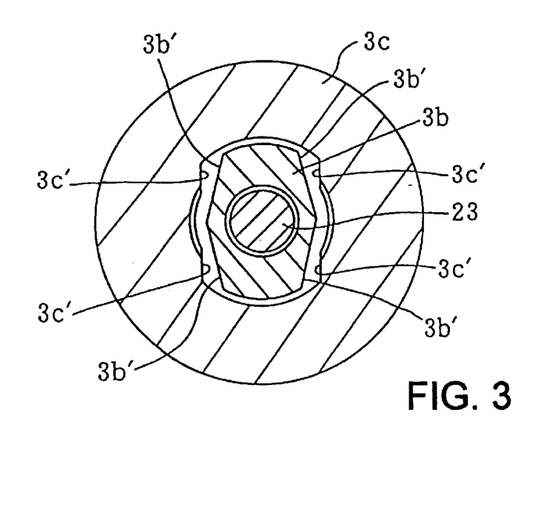
FIG. 3 is a cross-sectional view of FIG. 2 along the III—III line.

As illustrated in FIG. 3, a portion of the outer circumference of the first shaft 3b and a portion of the inner circumference of the second shaft 3c constitute non-circular portions 3b' and 3c', which face to each other. Since the non-circular portion 3b' of the first shaft 3b and the non-circular portion 3c' of the second shaft 3c can contact with each other, the relative rotation of the two shafts 3b and 3c is restrained within a given range. Therefore, breakage of the torsion bar 23 is prevented when an excessive torque is exerted on the shaft 3.

The torque sensor 7 has a first detection coil 33 retained by the housing 21, a second detection coil 34 retained by the housing 21, a first detection ring 36 made of a magnetic material and fixed on the outer circumference of the first shaft 3b, and a second detection ring 37 made of a magnetic material and fixed on the outer circumference of the second shaft 3c. One face of the first detection ring 36 and one face of the second detection ring 37 are arranged so as to be opposite to each other. On the mutually opposite faces of the detection rings 36 and 37, a plurality of teeth 36a and 37a are provided along the circumferential direction. In the first detection ring 36, the outer circumference adjacent to the other face is a lesser-diameter portion 36b whose outer diameter is smaller than that of the outer circumference adjacent to the one face. The first detection coil 33 is arranged to surround a gap between the first detection ring 36 and the second detection ring 37. The second detection coil 34 is arranged to surround the first detection ring 36. Each of the detection coils 33 and 34 is connected to a printed board 41 attached to the housing 21 via wires.

Figure 4:
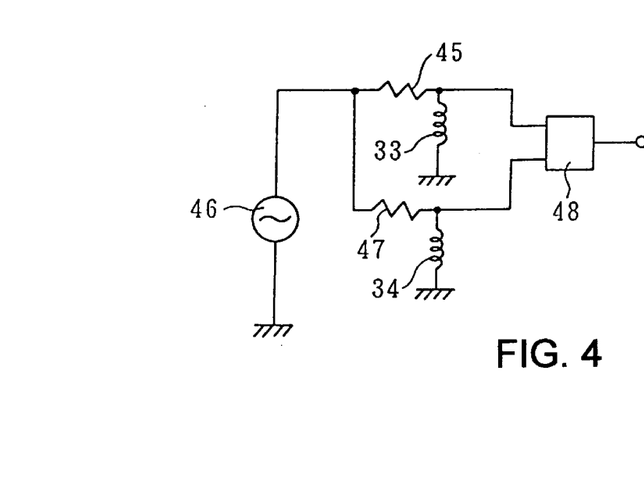
FIG. 4 is a diagram for explanation of the circuit of the torque sensor of the electric power steering device in the first embodiment of the present invention.

The printed board 41 has a signal processing circuit illustrated in FIG. 4. To be more precise, the first detection coil 33 is connected to an oscillator 46 via a resistor 45, the second detection coil 34 is connected to the oscillator 46 via a resistor 47, and each of the detection coils 33 and 34 is connected to a differential amplifier 48. By this constitution, when the torsion bar 23 is twisted by the transmitted torque, the first detection ring 36 and the second detection ring 37 rotate relative to each other. This relative rotation causes the facing areas of the teeth 36a and 37a of the detection rings 36 and 37 to be changed. This change of the areas causes the magnetic reluctance with respect to the magnetic flux generated by the first detection coil 33 in the gap between the teeth 36a and 37a to be changed. Because the output of the first detection coil 33 is changed in accordance with the change of the magnetic reluctance, the transmission torque corresponding to the output is detected. The second detection coil 34 faces the lesser-diameter portion 36b of the first detection ring 36. The outer diameter of the lesser-diameter portion 36b is determined such that, the magnetic reluctance with respect to the magnetic flux generated by the second detection coil 34 and the magnetic reluctance with respect to the magnetic flux generated by the first detection coil 33 are equalize to each other when there is no steering resistance. Therefore, fluctuations of the output of the first detection coil 33 due to temperature change is canceled out by the differential amplifier 48, because it is equalized to the fluctuations of the output of the second detection coil 34 due to temperature change. Therefore, fluctuations of the detected value of the transmitted torque due to temperature change are compensated for. According to signals corresponding to the transmitted torque outputted by the differential amplifier 48, the motor 8 is driven.

The motor 8 is provided so as to cover the rack 4 protruding from the pinion housing 30. That is, the motor 8 has a motor housing 8a attached to the pinion housing 30, a stator 8b fixed to the motor housing 8a, a cylindrical rotor (output element) 8e supported by the motor housing 8a via bearings 8c and 8d so as to be rotatable, and a magnet 8f fixed to the rotor 8e. The rotor 8e surrounds the rack 4.

Figure 5:
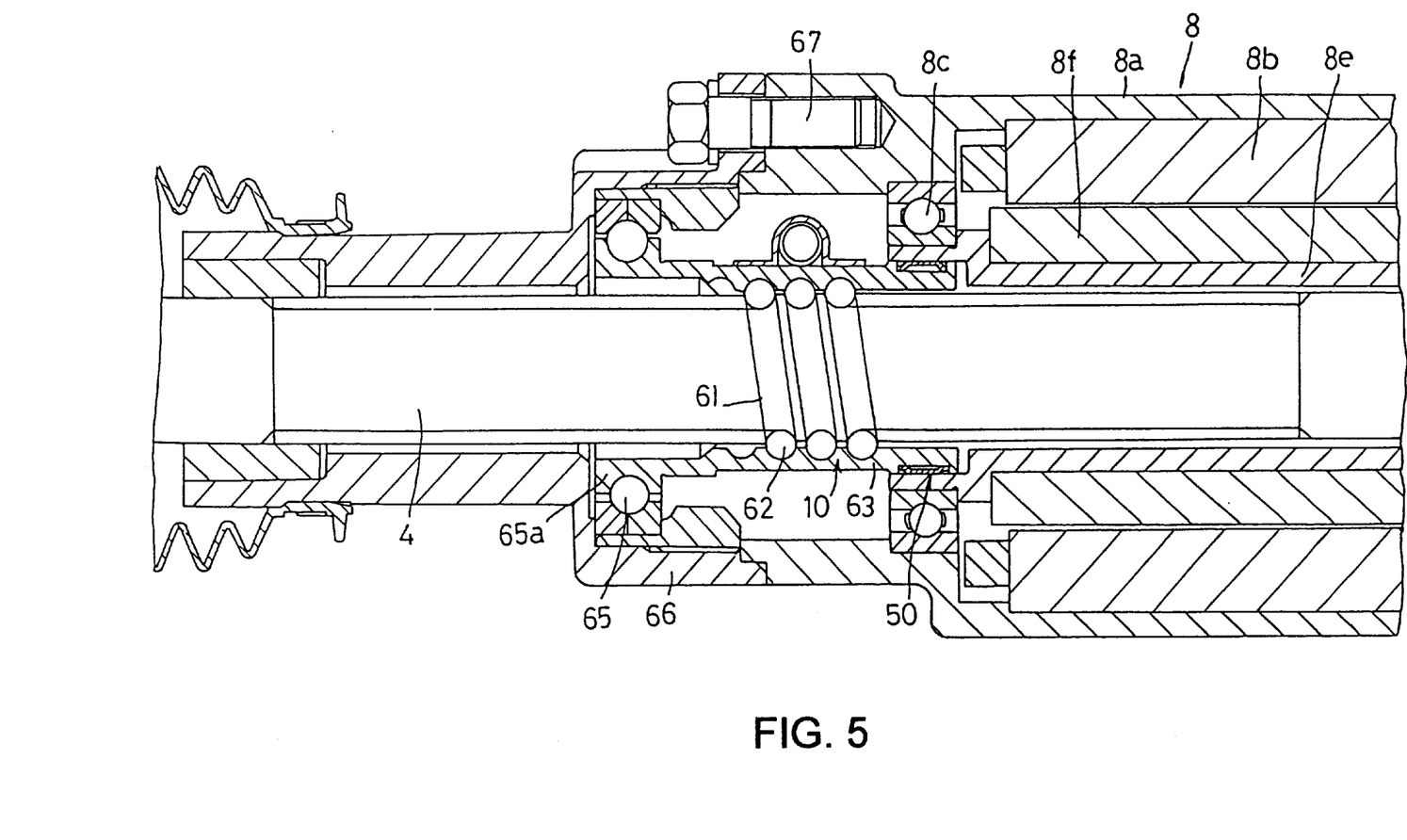
FIG. 5 is a cross-sectional view of the main portion of the electric power steering device in the first embodiment of the present invention.

As illustrated in FIG. 5, the screw mechanism 10 for transmitting the torque of the motor 8 to the rack 4 has a ball screw shaft 61, which is monolithically formed on the outer circumference of the rack 4, and a ball nut (rotary element) 63, which is screwed on the ball screw shaft 61 via a ball 62. One end of the ball nut 63 constitutes an inner ring 65a of a ball bearing 65, and is supported by a cylindrical rack cover 66 via the ball bearing 65. The rack cover 66 is attached to the motor housing 8a by a bolt 67. A torque limiter 50 is provided between the other end of the ball nut 63 and the rotor 8e. By this constitution, a steering assistance power along the longitudinal direction of the rack 4 is generated by driving the ball nut 63 by the motor 8.

Figure 6:
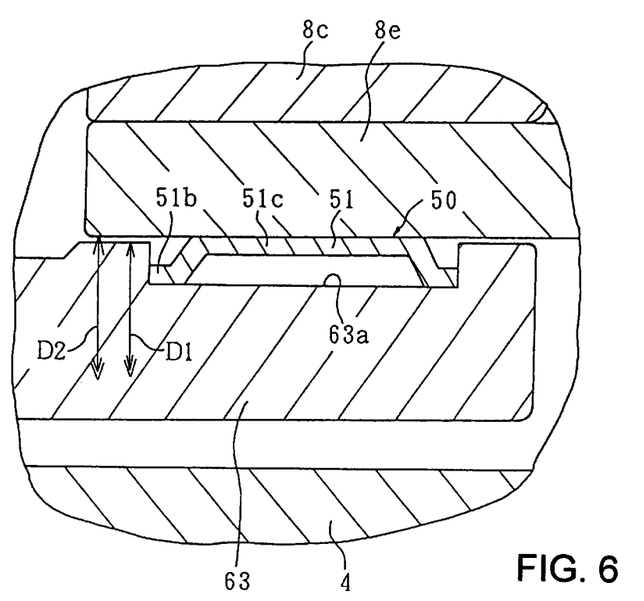
FIG. 6 is a magnified cross-sectional view of the main portion of the electric power steering device in the first embodiment of the present invention.

As illustrated in FIG. 6, the torque limiter 50 has a torque setting element 51. The torque setting element 51 is radially deformed by being sandwiched between the outer circumference of the other end of the ball nut 63 and the inner circumference of one end of the rotor 8e. The diameter D1 of the outer circumference of the other end of the ball nut 63 is not greater than the diameter D2 of the inner circumference of the one end of the rotor 8e, and the torque setting element 51 is fitted into a circumferential groove 63a formed on the outer circumference of the other end of the ball nut 63.

Figure 7A:
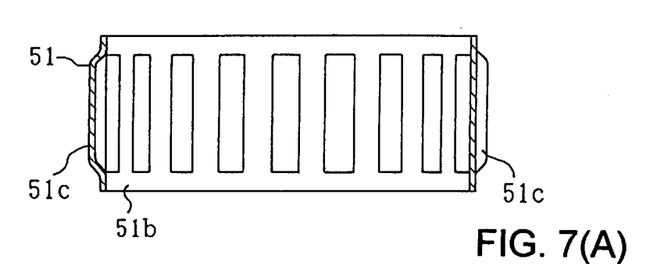
FIG. 7(A) is a cross-sectional view of the torque setting element in the embodiments of the present invention.
Figure 7B:
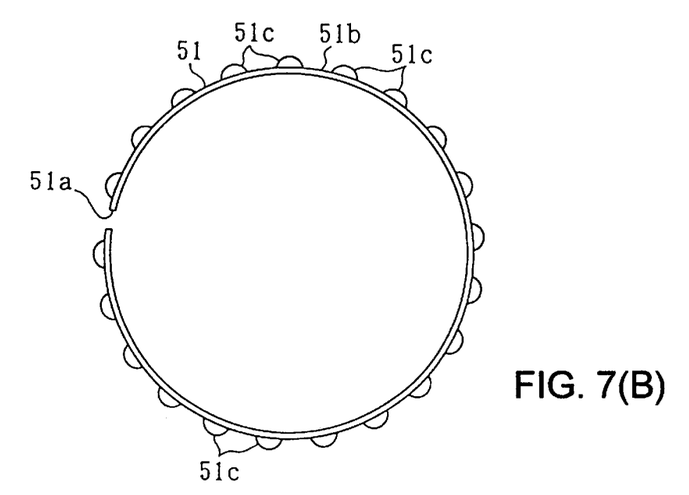
FIG. 7(B) is a frontal view of the torque setting element in the embodiments of the present invention.

As illustrated in FIGS. 7(A) and 7(B), the torque setting element 51 comprises a metal ring body 51b having a split 51a and a plurality of semi-cylindrical projections 51c monolithically formed on the ring body 51b. The projections 51c are arranged along the circumferential direction at constant intervals, and radially outwardly protrudes from the ring body 51b. A radial force corresponding to the radial deformation of the projections 51c is exerted on the ball nut 63 and the rotor 8e. As the torque setting element 51, a tolerance ring (made by the Rencol Tolerance Rings Company, SV type), for example, can be used.

Figure 8:
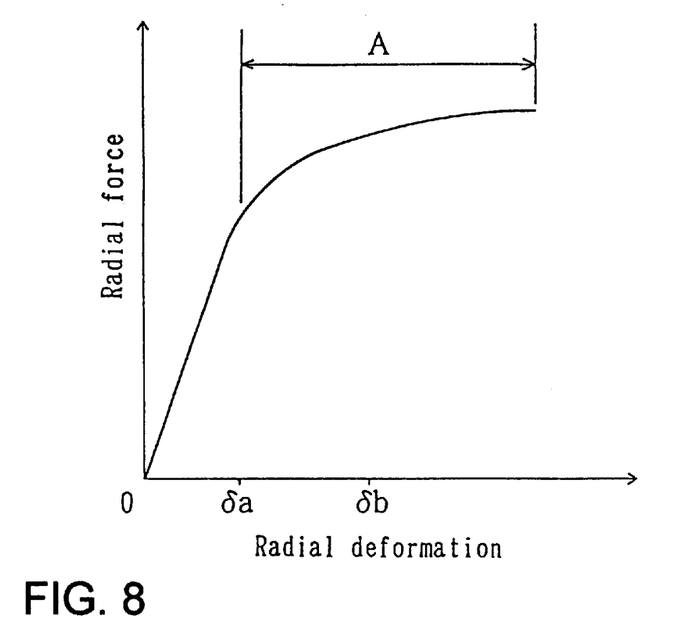
FIG. 8 is a diagram showing the relationship between the radial deformation of the torque setting element and the radial force in the embodiments of the present invention.

FIG. 8 shows the relationship between the radial deformation and the radial force in the torque setting element 51. When the radial deformation is less than a specific value δa, the radial force increases in proportion to the radial deformation. When the radial deformation exceeds the specific value δa, that is, in a range A in the figure, the ratio of increase in the radial force relative to the radial deformation is smaller than that when the radial deformation is less than the specific value δa. The radial deformation of the torque setting element 51 is set to a value δb in the range A in which the radial deformation exceeds the specific value δa.

According to the above-described constitution, a radial force corresponding to the radial deformation of the torque setting element 51 is exerted on the ball nut 63 and the rotor 8e. Therefore, the torque can be transmitted between the ball nut 63 and the rotor 8e by a frictional resistance between the torque setting element 51 and the ball nut 63 and a frictional resistance between the torque setting element 51 and the rotor 8e. Also, the limit torque depends on the frictional resistance. In the present embodiment, the frictional resistance between the torque setting element 51 and the ball nut 63 is smaller than the frictional resistance between the torque setting element 51 and the rotor 8e. When the torque setting element 51 and the ball nut 63 begin to slip relatively, the transmission torque is equal to the limit torque of the torque limiter 50. The limit torque can be determined experimentally.

According to the above-described power steering device 1, because the rotation of the motor 8 can be transmitted from the rotor 8e to the ball nut 63 via the torque limiter 50, rattling during the transmission of the rotation, noise to the driver and durability reduction can be prevented. Also, even if the motor 8 is locked, fail-safe function is ensured, because the rotor 8e and the ball nut 63 can be relatively rotated via the torque limiter 50, and thus the steering operation does not become impossible. Because the torque limiter 50 can be configured simply by adding a torque setting element 51, it is possible to simplify the structure, decrease the number of parts and machining processes, and reduce production cost. Also, the ratio of increase in radial force to the radial deformation of the torque setting element 51 is smaller than that at the time when the radial force increases in proportion to the radial deformation. Therefore, the variation in the radial force can be decreased even if the radial deformation of the torque setting element 51 is varied from a design value due to machining tolerance in the diametric dimensions of the rotor 8e and ball nut 63. The limit torque, which depends on the radial force, can therefore be accurately set within a desired setting range. Therefore, the necessity of a limit torque adjusting mechanism is obviated, limit torque adjusting labor is saved, and the structure is simplified by reducing the number of parts is reduced.

Figure 9:
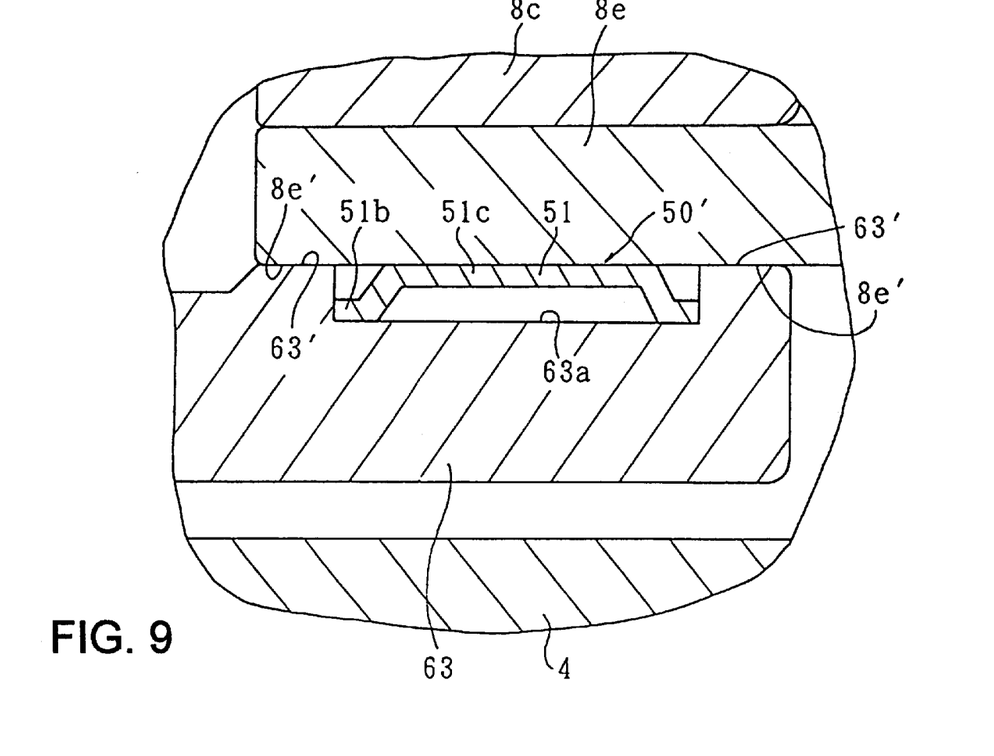
FIG. 9 is a cross-sectional view of the main portion of the electric power steering device in the second embodiment of the present invention.

FIG. 9 illustrates the second embodiment of the present invention, wherein the portions identical to those in the first embodiment are indicated by the same symbols. The second embodiment differs from the first embodiment, that is, the outer circumference 63' of the other end of the ball nut 63 is pressed against the inner circumference 8e' of the one end of the rotor 8e at outside the both ends of the torque setting element 51 by forcing the ball nut 63 into the rotor 8e. The press fit portion constitutes a torque limiter 50' together with the torque setting element 51. Thereby, the limit torque of the torque limiter 50' corresponds to the total of the first frictional resistance corresponding to the radial deformation of the torque setting element 51 and the second frictional resistance corresponding to the force with which the ball nut 63 is forced into the rotor 8e. That is, by exerting a radial force corresponding to the radial deformation of the torque setting element 51 on the ball nut 63 and the rotor 8e, a frictional resistance between the torque setting element 51 and the ball nut 63 and also a frictional resistance between the torque setting element 51 and the rotor 8e are generated, wherein the smaller one of the two frictional resistances is the first frictional resistance. Also, by forcing the ball nut 63 into the rotor 8e, a second frictional resistance is generated between the ball nut 63 and the rotor 8e. The first frictional resistance is greater than the second frictional resistance. The other aspects are the same as those in the first embodiment.

According to the second embodiment, a torque can be transmitted between the ball nut 63 and the rotor 8e by the total of the first frictional resistance corresponding to the radial deformation of the torque setting element 51 and the second frictional resistance corresponding to the force with which the ball nut 63 is forced into the rotor 8e. The limit torque depends on the total of the first frictional resistance and the second frictional resistance. In the present second embodiment, the frictional resistance between the torque setting element 51 and the ball nut 63 is smaller than the frictional resistance between the torque setting element 51 and the rotor 8e. When the torque setting element 51 and the ball nut 63 begin to slip relatively and also the ball nut 63 and the rotor 8e begin to slip relatively, the transmission torque is equal to the limit torque of the torque limiter 50'. The limit torque can be determined experimentally. By this constitution, when the transmission torque between the rotor 8e and the ball nut 63 exceeds the limit torque of the torque limiter 50', the torque setting element 51 and the ball nut 63 slip relatively and the ball nut 63 and the rotor 8e slip relatively. By these slippage, the ball nut 63 and the rotor 8e are relatively rotated.

According to the second embodiment, the same effect as that obtained in the first embodiment can be achieved. Moreover, the limit torque can be set according to the total of the first frictional resistance corresponding to the radial deformation of the torque setting element 51 and the second frictional resistance corresponding to the press fit force with which the ball nut 63 is forced into the rotor 8e. Therefore, in this case the torque setting element 51 can be made more compact than in the case where the limit torque is set according to the first frictional resistance alone, so that the device can be made more compact in whole. Also, the press fit force can be more roughly set when the limit torque is set within a desired setting range, in comparison with the case where the limit torque is set according to the press fit force alone. Thereby, the necessity of increasing the dimensional precision in the outer circumference of the ball nut 63 and the inner circumference of the rotor 8e at the press fit portion is obviated. Also, the press fit force can be more roughly set by making the first frictional resistance greater than the second frictional resistance, which in turn makes it easier to set the limit torque within the desired setting range.

The present invention is not limited to the above-described embodiments. For example, the rotary element screwed on the rack is not limited to a ball nut, and can be a nut screwed on a trapezoidal screw formed on the outer circumference of the rack. Also, the torque setting element is not limited to a tolerance ring, and can be any one, as long as it is capable of exerting a radial force corresponding to the radial deformation on the rotary element and the output element.

What is claimed is:

1. An electric power steering device of a vehicle, comprising:

a pinion which rotates by steering operation;

a rack engaged with the pinion;

a rotary element screwed on the rack;

a motor which drives the rotary element, the motor including an output element; and a torque limiter provided between the rotary element and the ouput element of the motor;

wherein the vehicle is steered by the longitudinal shifting of the rack due to the rotation of the pinion; and wherein steering assistance power is generated along the longitudinal direction of the rack by the rotation of the rotary element.

2. The electric power steering device according to claim 1, wherein:

the torque limiter has a torque setting element which is radially deformed by being sandwiched between the rotary element and the output element;

wherein a radial force corresponding to the radial deformation of the torque setting element is exerted on the rotary element and the output element; and wherein limit torque of the torque limiter corresponds to the radial deformation of the torque setting element.

3. The electric power steering device according to claim 1, wherein:

the torque limiter has a torque setting element which is radially deformed by being sandwiched between the rotary element and the output element;

wherein a radial force corresponding to the radial deformation of the torque setting element is exerted on the rotary element and the output element;

wherein the rotary element is forced into the output element; and wherein limit torque of the torque limiter corresponds to the total of a first frictional resistance, which corresponds to the radial deformation of the torque setting element, and a second frictional resistance, which corresponds to the press fit force with which the rotary element is forced into the output element.

4. The electric power steering device according to claim 3, wherein:

the first frictional resistance is greater than the second frictional resistance.

5. The electric power steering device according to claim 2, wherein:

the torque setting element has a characteristic, in that the radial force increases in proportion to the radial deformation when the radial deformation is less than a specific value, and the ratio of increase in the radial force to the radial deformation at the time when the radial deformation exceed the specific value is smaller than that at the time when the radial deformation is below the specific value, and the radial deformation of the torque setting element is set to a value in the range in which the radial deformation exceeds the specific value.

6. The electric power steering device according to claim 3, wherein:

the torque setting element has a characteristic, in that the radial force increases in proportion to the radial deformation when the radial deformation is less than a specific value, and the ratio of increase in the radial force to the radial deformation at the time when the radial deformation exceed the specific value is smaller than that at the time when the radial deformation is below the specific value, and the radial deformation of the torque setting element is set to a value in the range in which the radial deformation exceeds the specific value.

7. The electric power steering device according to claim 4, wherein:

the torque setting element has a characteristic, in that the radial force increases in proportion to the radial deformation when the radial deformation is less than a specific value, and the ratio of increase in the radial force to the radial deformation at the time when the radial deformation exceed the specific value is smaller than that at the time when the radial deformation is below the specific value, and the radial deformation of the torque setting element is set to a value in the range in which the radial deformation exceeds the specific value.

* * * * *